Oct. 4, 1966　　　D. L. PEEPLES　　　3,276,207
MASTER CYLINDER
Filed May 3, 1965
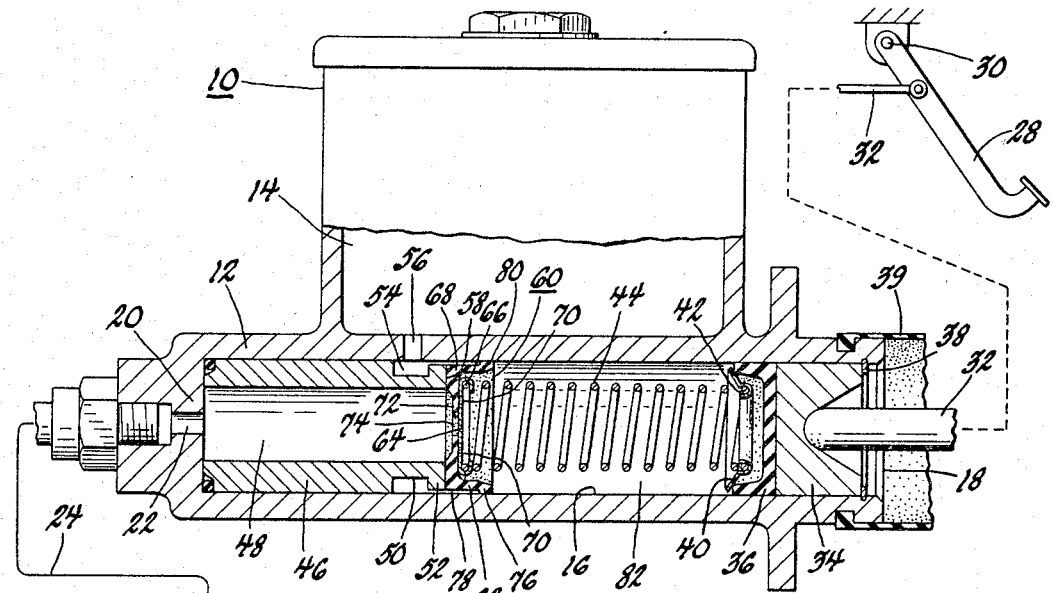
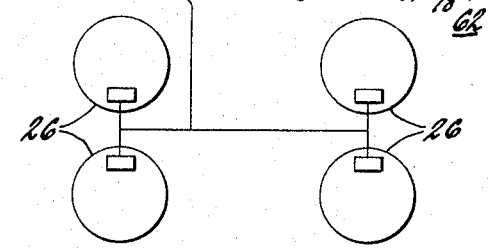
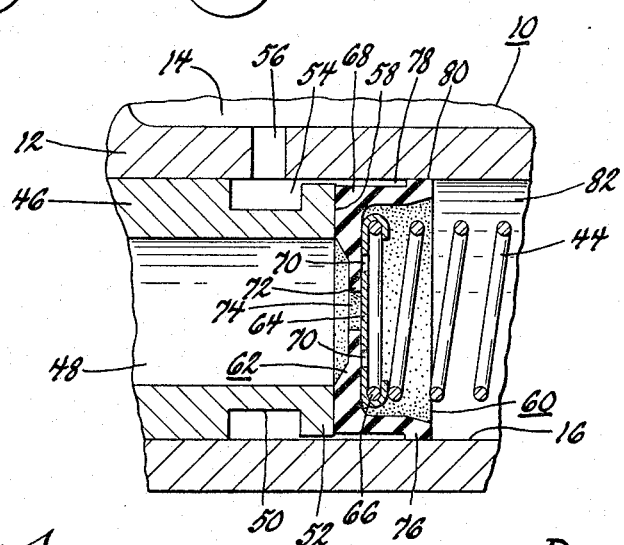
Fig. 1
Fig. 2
INVENTOR.
Denny L. Peeples
BY D. D. McGraw
HIS ATTORNEY

United States Patent Office 3,276,207
Patented Oct. 4, 1966

3,276,207
MASTER CYLINDER
Denny L. Peeples, Dayton, Ohio, assignor to General Motors Corporation, Detroit, Mich., a corporation of Delaware
Filed May 3, 1965, Ser. No. 452,642
8 Claims. (Cl. 60—54.6)

The invention relates to a fluid pressurizing cylinder of the type commonly referred to as a master cylinder, and more particularly to one having a unique fluid control arrangement. A master cylinder embodying the invention has no compensation port over which a pressurizing cup must pass at any time. The master cylinder is constructed with a bore divided into a pressurizing chamber and a fluid pressure outlet chamber and a fluid compensation chamber. These chambers are separated by a check valve assembly which may be referred to as a two-way check valve. The check valve assembly includes a check valve section permitting flow only from the pressurization chamber into the fluid pressure outlet chamber, another check valve section which permits flow only from the fluid pressure outlet chamber to the fluid compensation chamber, and a third check valve section which permits fluid flow only from the fluid compensation chamber to the pressurizing chamber. The flow of fluid through each valve section depends upon the condition of the master cylinder. When the master cylinder is initially pressurized, the only check valve section that opens is the section connecting the pressurizing chamber and the pressure outlet chamber. When the pressure is released from the fluid pressurizing chamber by the removal of pressurizing force, this check valve section is closed and the pressure differential existing between the pressure outlet chamber and the pressurizing chamber opens the second check valve section which permits fluid to flow from the pressure outlet chamber to the compensation chamber and be returned to the fluid reservoir. Should the pressurizing chamber become subjected to subatmospheric pressure during its pressure releasing condition of operation, the third check valve section opens to permit flow from the fluid compensation chamber to the pressurizing chamber.

A fluid pressure actuated system connected with the fluid pressure outlet chamber is fully fluid compensated during a cycle of operation of the master cylinder. The pressurizing chamber is also fully fluid compensated during such a cycle of operation. A fluid connection is provided between the fluid reservoir and the fluid compensation chamber which does not include any portion of a wall of the pressurizing chamber over which a seal or pressurizing cup must pass during master cylinder pressurization or release. This therefore eliminates the possibility of extruding a seal or cup into a compensation port. The master cylinder construction lends itself to use of a pressurizing piston and cup which may be identical with that of brake wheel cylinders currently in common usage. The check valve assembly also acts as a residual pressure check valve so as to maintain a slight pressure in the pressure actuated system when the master cylinder has no operator applied pressurizing force acting thereon.

In the drawings:

FIGURE 1 is a schematic representation of a vehicle brake system having a master cylinder therein embodying the invention, the master cylinder assembly being illustrated with parts broken away and in section.

FIGURE 2 is an enlarged sectional view of the portion of the master cylinder assembly of FIGURE 1 particularly including the check valve assembly.

The master cylinder assembly 10 has a housing or body 12 formed to provide a fluid reservoir 14 and is also provided with a bore 16. The bore has its rear end 18 open so as to permit assembly and disassembly of the master cylinder unit. The forward end 20 of the bore is closed except for a fluid outlet passage 22. A brake line 24 is connected to outlet passage 22 and is in turn connected to the brake assemblies 26. When the system is utilized in the preferred environment of a vehicle, as is common practice, an operator movable brake pedal 28 is suitably pivoted at 30 to a portion of the vehicle. A push rod 32 is schematically illustrated as directly connecting the brake pedal and the master cylinder unit. It is to be understood that a suitable booster or full power mechanism may be interposed between the brake pedal 28 and the portion of the push rod engaging the master cylinder unit. A piston 34 is reciprocably received within bore 16 and provides suitable fluid pressurizing means. The piston has a pressure cup or seal 36 on the forward end thereof. It is contemplated that the piston 34 and the cup 36 may be identical in construction to wheel cylinder pistons and cups currently utilized in vehicle brake systems. However, other piston and cup constructions may be utilized. A retainer 38 in the end 18 of the bore provides a backstop for the piston 34 when it is in the released position. A boot 39 may seal the bore end 18 by being mounted on the body and the push rod 32. A cup expander and spring seat 40 is provided in the forward end of the cup 36 which performs the usual function of maintaining the cup lip in sealing engagement with the bore wall as well as providing a seat for the rear end 42 of spring 44.

The forward or closed end of bore 16 has a cylindrically formed valve body 46 positioned therein, with the interior of the body forming a fluid pressure outlet chamber 48. The fluid pressure outlet 22 opens into chamber 48. An annular exterior groove 50 is provided adjacent the rear end of body 46 and the land 52 at the rear end of the body 46 and forming one side of groove 50 has a reduced outer diameter in relation to the diameter of bore 16 so that an extension from groove 50 is spaced radially outward of land 52 to cooperate with the wall of bore 16 and groove 50 to define fluid compensation chamber 54. Valve body 46 remains with one end in engagement with the closed end surface of bore 16 at all times.

Compensation passage 56 is formed in housing 12 to provide fluid communication between the reservoir 14 and the chamber 54. The rear surface of valve body 46 provides an annular valve seat 58. The radially outer side of valve seat 58 terminates at chamber 54 and the radially inner side terminates at chamber 48.

The check valve assembly 60 includes, in addition to spring 44 and valve body 46, a cup-like member 62 and a spring seat 64. The forward end 66 of spring 44 is received by spring seat 64.

The cup-like member 62 includes an annular section 68 having one side in axial alignment with the valve seat 58 so that the annular section acts as a valve in cooperation with that valve seat. This valve may be referred to as a second or intermediate valve or valve section.

The spring seat 64 is provided with a plurality of apertures 70 which are spaced radially within the area defined by the rear end of chamber 48. Spring seat 64 is positioned on the opposite side of member 62 from the valve body 46. The member 62 has an inwardly extending flexible annular lip 72 which covers apertures 70. The aperture 74 defined by the inner annulus of lip 72 lies radially inside of the innermost portions of apertures 70 so that aperture 74 is in alignment with apertures 70. Apertures 70 and 74 and lip 72 provide a valve which may be referred to as a first or inner valve or valve section.

Spring seat 64 extends radially outwardly in engagement with member 62 a sufficient distance to back up the annular section 68 of the member. A rearwardly extending annular lip 76 is provided on the member 62 radially outward of the annular section 68. Lip 76 may be provided with an annular external groove 78, with the extreme outer end of the lip being formed as a land 80 which is in engagement with the wall of bore 16. The volume defined by groove 78 is, therefore, also a part of the fluid compensation chamber 54. Lip 76, and particularly land 80, and the wall of bore 16 cooperate to provide a valve which may be referred to as a third or outer valve or valve section. It can be seen that a fluid pressurizing chamber 82 is provided between the pressurizing piston 34 (with its cup 36) and the check valve assembly 60, and that spring 44 is positioned within this chamber.

The master cylinder assembly is shown in the drawing in the pressure released position. When pressurizing force is applied through push rod 32, piston 34 and cup 36 are moved to the left against the force of compression spring 44. The check valve member 62 second valve or valve section, defined by valve seat 58 and annular section 68, is closed due to the force of spring 44 and also due to the pressure being generated in chamber 82. The third valve or valve section, defined by lip land 80 and the wall of bore 16 is likewise closed due to the higher pressure in chamber 82 relative to the pressure in chamber 54, as well as the fact that member 62 is so constructed that the land normally engages the bore wall. Thus pressure cannot flow from the pressurizing chamber through either of these two valves or valve sections. However, the pressure in chamber 82, being increased to the extent that it is greater than the pressure in chamber 48, acts through apertures 70 to move annular lip 72 away from the portion of the spring seat containing apertures 70 and pressurized fluid passes through the first valve or valve section, defined by apertures 70, lip 72 and the spring seat 64, and aperture 74, and into chamber 48. This pressurized fluid is then transmitted to the brake assemblies 26 by means of fluid pressure outlet 22 and brake line 24.

When the pressurizing force exerted through push rod 32 is lessened, spring 44 and the pressure in chamber 82 moves the piston 34 and cup 36 rearwardly. This decreases the pressure in chamber 82 so that the pressure in fluid pressure outlet chamber 48 tends to be at a higher pressure. This higher pressure acts on the portion of cup-like member 62 exposed to chamber 48, as well as the portion of spring seat 64 exposed to chamber 48 through aperture 74, and at a selected differential pressure will overcome the force of spring 44 so that the member 62 and the spring seat 64 are moved rearwardly to open the second or intermediate valve or valve section. Also, due to this differential pressure, annular lip 72 is held tightly against spring seat 64 so that the first or inner valve or valve section is closed. Thus the fluid pressure outlet chamber 48 is connected to the fluid compensation chamber 54 and the pressurized fluid in the brake system is returned to the reservoir. The pressure in the brake system is also released in this manner. Since chamber 82 had been decreased in a volume due to the pressurizing movement of piston 34, and is now increasing in volume due to the rearward movement of piston 34 and cup 36, the higher fluid pressure in fluid compensation chamber 54 relative to that pressure in chamber 82 acts on lip 76 to move that lip radially inwardly and open the third or outer valve or valve section so that fluid is passed from the compensation chamber into the chamber 82 as the latter chamber increases in volume. When the pressure in chamber 48 decreases to the desired residual pressure to be maintained in the brake line 24 and brake assemblies 26, as determined by the compression force in spring 44 with the piston 34 in the fully released position, member 62 is moved by the spring so that annular section 68 again is seated on valve seat 58. This action occurs due to the decrease in pressure differential between chambers 48 and 82 to a desired amount. The master cylinder unit is, therefore, returned to the position illustrated in the drawing.

A master cylinder assembly has been provided which has no compensation port over which a pressurizing cup must pass. The master cylinder assembly includes a check valve assembly having three check valves or valve sections, each operating under certain desired conditions to permit fluid flow in a controlled manner. A first check valve or valve section permits flow from a pressure generating chamber to a pressure outlet chamber. A second check valve or valve section permits flow from the pressure outlet chamber to a fluid compensation chamber in response to a selected pressure differential between the pressurizing chamber and the fluid pressure outlet chamber. A third check valve or valve section permits fluid flow from the fluid compensation chamber to the pressurizing chamber when the fluid compensation chamber has a higher pressure than the pressure in the pressurizing chamber. The valve assembly also functions as a residual pressure check valve to maintain a suitable residual pressure in a fluid pressurizing system actuated by the master cylinder. In its preferred form the valve assembly has the first valve or valve section being the radially innermost valve, the second valve or valve section being a radially intermediately positioned valve, and the third valve or valve section being the radially outermost valve. The master cylinder assembly utilizes easily removable parts which are simple in construction. A full compensation of the fluid pressure actuating system and of the master cylinder itself is obtained during each cycle of master cylinder operation.

What is claimed is:

1. A master cylinder assembly comprising a body having a fluid reservoir and a cylinder bore,
   a pressurized fluid outlet at one end of said bore,
   a sleeve in said bore having a first chamber therein communicating with said outlet and
   an end providing a check valve seat,
   a two way check valve engaging said seat,
   a pressurizing piston in said bore spaced from said check valve,
   a spring between said check valve and said piston urging said check valve into seating engagement with said seat and urging said piston to a pressure release position,
   said check valve and said piston and a portion of said bore defining a fluid pressurizing second chamber containing said spring,
   and compensating passage means connecting said reservoir and said check valve seat on the side thereof opposite said first chamber, said check valve also separating said compensating passage means and said second chamber.

2. A master cylinder assembly comprising:
   a body having a fluid reservoir and a cylinder bore;
   a fluid outlet chamber in one end of said bore;
   a pressurizing piston in said bore and cooperating with the bore wall to define a fluid pressurizing chamber;
   a two way check valve assembly in said bore separating said fluid outlet chamber and said pressurizing chamber and including
   an annual valve seat at the end of said fluid outlet chamber facing said pressurizing chamber,
   a valve reciprocably movable in said bore in seated and unseated relation to said valve seat and a spring acting on said valve urging it against said seat, said valve having a valve section in fluid flow alignment with said outlet chamber and permitting fluid flow only from said pressurizing chamber to said outlet chamber,
   and a cup section engaging the wall of said bore and permitting fluid flow only into said pressurizing chamber;

and compensating port means providing fluid communication to the outer side of said valve seat and on the side of said cup section opposite said pressurizing chamber.

3. A master cylinder assembly having a fluid pressurizing chamber; a fluid pressure outlet chamber; a fluid compensation chamber; and a valve assembly comprising a first fluid pressure responsive check valve permitting fluid flow only from said fluid pressure chamber to said fluid pressure outlet chamber, a second fluid pressure responsive check valve permitting fluid flow only from said fluid pressure outlet chamber to said fluid compensation chamber in response to a selected greater pressure in said fluid pressure outlet chamber than in said fluid pressure chamber, and a third fluid pressure responsive check valve permitting fluid flow only from said fluid compensation chamber to said fluid pressurizing chamber in response to a selected greater pressure in said fluid compensation chamber than in said fluid pressurizing chamber.

4. The master cylinder assembly of claim 3, said first pressure responsive check valve being positioned in a radially inward portion of said valve assembly and said third fluid pressure responsive check valve being positioned in a radially outward portion of said valve assembly and said second fluid pressure responsive check valve being positioned in a radially intermediate portion of said valve assembly.

5. The master cylinder assembly of claim 3, said valve assembly including a cylindrical body having an annual valve seat forming a part of said second fluid pressure responsive check valve and an inner surface defining an outer wall of said fluid pressure outlet chamber and an outer surface defining an inner wall of said fluid compensation chamber.

6. The master cylinder assembly of claim 3, further including a body provided with a bore therein receiving said valve assembly and defining portions of each of said chambers.

7. The master cylinder assembly of claim 3, said valve assembly more particularly comprising: an annual valve seat having said fluid pressure outlet chamber on the inner side thereof and said fluid compensation chamber on the outer side thereof;

a resilient valve member having an annual valve section cooperating with said seat to define said second fluid pressure responsive check valve;

a flexible annual lip section extending radially inwardly of said annular valve section;

a spring seat engaging said resilient valve member on the side opposite said valve seat and having a spring seated thereon urging said resilient valve member toward said valve seat, said spring seat having a plurality of apertures in alignment with said flexible lip and cooperating therewith to define said first fluid pressure responsive check valve;

and a cup-like lip section extending radially outwardly of said annular valve section and axially away from said compensation chamber and being a part of said third fluid pressure responsive check valve.

8. In a master cylinder assembly, a body having a fluid reservoir and a bore, a valve assembly dividing said bore into a fluid pressurizing chamber and a fluid pressure outlet chamber and a fluid compensation chamber, a first port in said body fluid connecting said reservoir and said fluid compensation chamber, and a second port in said body providing a pressure outlet connection from said fluid pressure outlet chamber to a mechanism to be fluid pressure operated, said valve assembly having a first section permitting fluid flow only from said fluid pressurizing chamber to said fluid pressure outlet chamber and a second section permitting fluid flow only from said fluid pressure outlet chamber to said fluid compensation chamber and a third section permitting fluid flow only from said fluid compensation chamber to said fluid pressurizing chamber.

No references cited.

MARTIN P. SCHWADRON, *Primary Examiner.*

R. R. BUNEVICH, *Assistant Examiner.*

UNITED STATES PATENT OFFICE
CERTIFICATE OF CORRECTION

Patent No. 3,276,207                            October 4, 1966

Denny L. Peeples

It is hereby certified that error appears in the above numbered patent requiring correction and that the said Letters Patent should read as corrected below.

Column 5, line 38, and column 6, lines 2, 5 and 8, for "annual" each occurrence, read -- annular --.

Signed and sealed this 22nd day of August 1967.

(SEAL)
Attest:

ERNEST W. SWIDER                          EDWARD J. BRENNER
Attesting Officer                            Commissioner of Patents